United States Patent
Inagaki et al.

(10) Patent No.: US 6,686,090 B2
(45) Date of Patent: Feb. 3, 2004

(54) BATTERY WITH A NONAQUEOUS ELECTROLYTE AND A NEGATIVE ELECTRODE HAVING A NEGATIVE ELECTRODE ACTIVE MATERIAL OCCLUDING AND RELEASING AN ACTIVE MATERIAL

(75) Inventors: Hiroki Inagaki, Kanagawa-ken (JP); Norio Takami, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 213 days.

(21) Appl. No.: 09/797,883

(22) Filed: Mar. 5, 2001

(65) Prior Publication Data

US 2001/0046629 A1 Nov. 29, 2001

(30) Foreign Application Priority Data

Mar. 15, 2000 (JP) ........................................ 2000-072377

(51) Int. Cl.⁷ ................................................. H01M 4/58
(52) U.S. Cl. .................................... 429/218.1; 429/224
(58) Field of Search .............................. 429/218.1, 224

(56) References Cited

U.S. PATENT DOCUMENTS 5,770,333 A    6/1998 Saito et al.
5,807,646 A  * 9/1998 Iwata ........................ 429/224

FOREIGN PATENT DOCUMENTS

JP    7-122274    5/1995
JP    7-288123    10/1995

* cited by examiner

Primary Examiner—Mark Ruthkosky
(74) Attorney, Agent, or Firm—Oblon, Spivak, McClelland, Maier & Neustadt, P.C.

(57) ABSTRACT

The development of a novel negative electrode material has led to the provision of a battery with a nonaqueous electrolyte which has a combination of a high discharge capacity with excellent cycling characteristics. The battery with a nonaqueous electrolyte comprises: a positive electrode; a negative electrode having a negative electrode active material capable of occluding and releasing an alkali metal; and a nonaqueous electrolyte. The negative electrode active material contains at least one element selected from the group consisting of group 4B elements and group 5B elements and has at least one crystal structure selected from the group consisting of $BiF_3$ structure, and $Cu_2MnAl$ structure. And the negative electrode active material contains at least one element selected from the group consisting of Al, Si, Ge, Sn, P, Sb and Bi and has at least one crystal structure selected from the group consisting of $BiF_3$ structure, and $Cu_2MnAl$ structure.

34 Claims, 2 Drawing Sheets

BATTERY WITH A NONAQUEOUS ELECTROLYTE AND A NEGATIVE ELECTRODE HAVING A NEGATIVE ELECTRODE ACTIVE MATERIAL OCCLUDING AND RELEASING AN ACTIVE MATERIAL

BACKGROUND OF THE INVENTION

1. Field of the Invention

The present invention relates to a battery with a nonaqueous electrolyte, and more particularly to a battery with a nonaqueous electrolyte, using an improved negative electrode active material.

2. Discussion of the Background

In recent years, rechargeable batteries with a nonaqueous electrolyte, using a lithium metal, a lithium alloy, a lithium compound, a carbon material or the like as a negative electrode active material have been expected as batteries with high energy density, and the research and development of these batteries are currently being energetically done. Up to now, lithium ion batteries using $LiCoO_2$, $LiMn_2O_4$ or the like as the positive electrode active material and a carbon material, capable of occluding and releasing lithium, as the negative electrode active material have been extensively put to practical use.

On the other hand, rechargeable batteries using a lithium metal, a lithium alloy, or a lithium compound as the negative electrode active material have been expected to have high capacity. They, however, have not yet been put to practical use. The reason for this is mainly that the use of the lithium metal leads to a deterioration of lithium as a result of a reaction of a nonaqueous electrolysis solution with the lithium metal and, in addition, the elimination of lithium due to the occurrence of dendritic lithium upon the repetition of discharge and charge and thus poses problems of internal short circuit and short cycle life. In order to solve these problems, studies have been made on the use of lithium alloys or lithium compounds as the negative electrode. In particular, in lithium-aluminum or other alloys, the reactivity with the nonaqueous electrolysis solution can be reduced to improve the charge and discharge efficiency. In this case, however, the repetition of a high level of discharge and a high level of charge causes crumbling of the electrode. Therefore, an improvement in cycle life characteristics is unsatisfactory.

Further, the use of chalcogen compounds, such as oxides, as the negative electrode active material has been proposed from the viewpoint of increasing the capacity in the negative electrode (for example, SnO and $SnO_2$; see Japanese Patent Laid-Open Nos. 122274/1995). Further, a proposal has been made to use amorphous oxides, such as $SnSiO_3$ or $SnSi_{1-x}P_xO_3$, to improve cycle characteristics (see Japanese Patent Laid-Open No. 288123/1995). At the present time, however, even these chalcogen compounds could not have simultaneously improved the cycle life characteristics and the capacity to a satisfactory level.

SUMMARY OF THE INVENTION

The present invention has been made with a view to solving the above problem of the prior art, and it is an object of the present invention to provide a battery with a nonaqueous electrolyte, which possesses a combination of high capacity with excellent cycle life, through the use of a negative electrode active material possessing a high capacity and excellent charge-discharge cycle characteristics.

According to one aspect of the present invention, there is provided a battery with a nonaqueous electrolyte, comprising: a positive electrode; a negative electrode having a negative electrode active material capable of occluding and releasing an alkali metal; and a nonaqueous electrolyte, said negative electrode active material containing at least one element selected from the group consisting of group 4B elements and group 5B elements and having at least one crystal structure selected from the group consisting of $BiF_3$ structure, $Cu_2MnAl$ structure, and AgAsMg structure. Above 4B elements and group 5B elements are selected from the group consisting of Si, Ge, Sn, P, Sb and Bi. Since Al does so the same effect as Sb, it can be replaced with and adopted as Sb. So the negative electrode can be contained the active material, the active material containing at least one element selected from the group consisting of Al, Si, Ge, Sn, P, Sb and Bi, and the active material having at least one crystal structure selected from the group consisting of $BiF_3$ structure, $Cu_2MnAl$ structure and AgAsMg structure.

According to an embodiment of the present invention, the negative electrode active material further contains an alkali metal.

The above negative electrode active material can occlude a large amount of an alkali metal such as lithium, and, at the same time, has high reversibility between an occlusion reaction and a release reaction and can solve the problem of crumbling involved in charge-discharge cycles. Thus, this negative electrode active material can realize a negative electrode possessing a long life and a high capacity. These advantageous characteristics are derived from the fact that the negative electrode active material according to the present invention is a structurally stable material which, even after the occlusion of a large amount of an alkali metal, can maintain the basic crystal structure.

In particular, from the viewpoints of both high capacity and long life, the crystal structure preferably comprises at least one member selected from the group consisting of $BiF_3$ structure, $Cu_2MnAl$ structure, and AgAsMg structure, and, more preferably, the negative electrode active material further contains an alkali metal from the viewpoint of long service life.

Further, at least one element selected from the group consisting of Al, Si, Ge, Sn, P, Sb and Bi is preferably contained from the viewpoint of high capacity. In particular, the negative electrode active material preferably contains antimony as an indispensable component.

DETAILED DESCRIPTION OF THE PREFERRED EMBODIMENTS

The rechargeable battery with a nonaqueous electrolyte (for example, a cylindrical rechargeable battery with a nonaqueous electrolyte) according to the present invention will be described with reference to FIG. 1.

Figure 1:
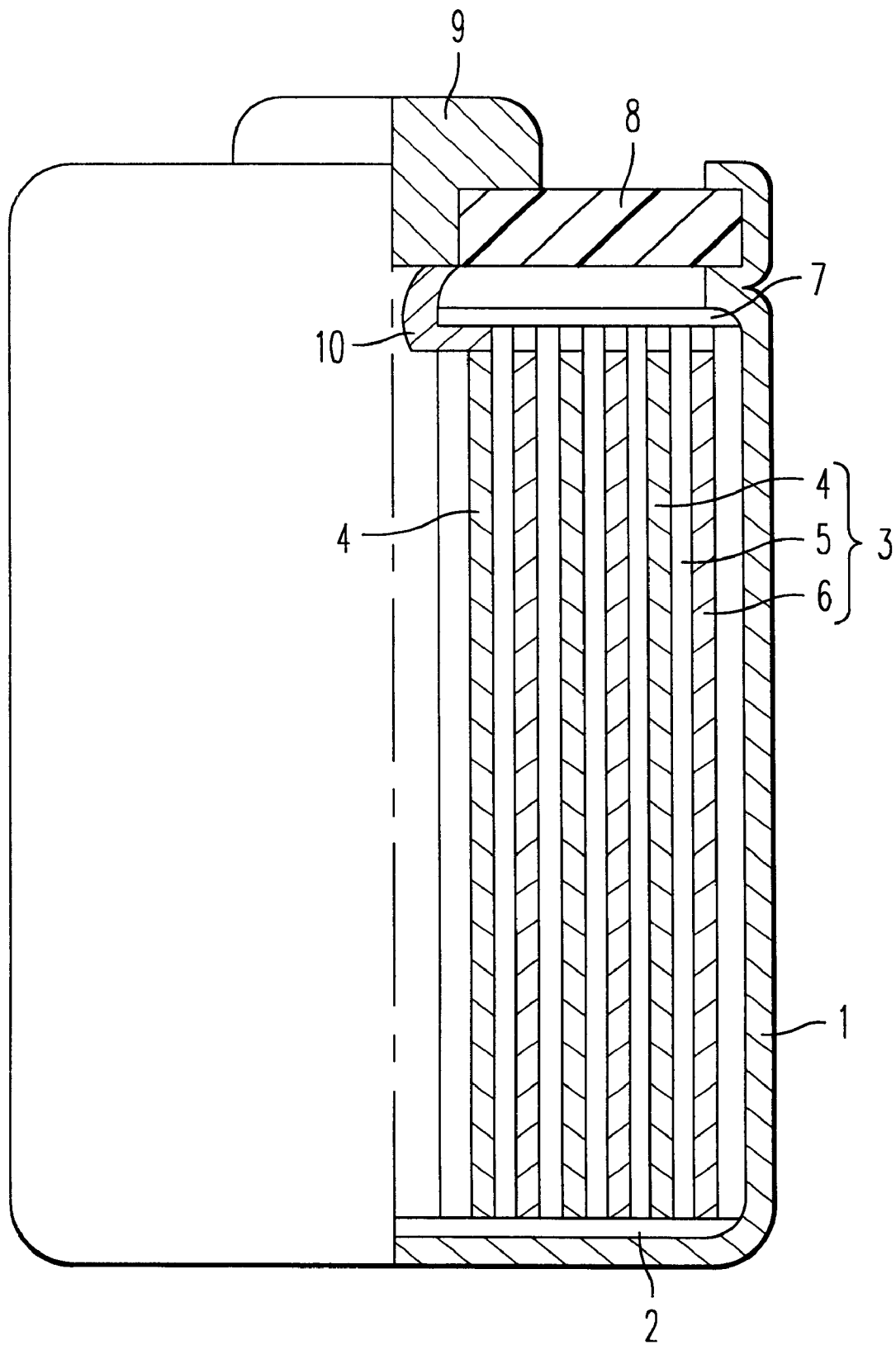
FIG. 1 is a partially sectional view showing an embodiment of a rechargeable lithium battery (a cylindrical rechargeable lithium battery) according to the present invention.

FIG. 1 shows an embodiment of a rechargeable battery with a nonaqueous electrolyte according to the present invention. In this battery, for example, an insulator 2 is disposed at the bottom of a closed-end cylindrical container 1 made of stainless steel. A group of electrodes 3 are housed in the container 1. The group of electrodes 3 have a structure such that a strip formed by stacking the positive electrode 4, the separator 5, the negative electrode 6, and the separator 5 in that order on top of one another is spirally wound in such a manner that the separator 5 is located outermost.

An electrolysis solution is placed within the container 1. An insulating paper 7 having an opening in its center is disposed above the group of electrodes 3 within the container 1. An insulating seal plate 8 is disposed in an upper opening in the container 1, and is fixed to the container 1 by inwardly crimping a portion around the upper opening. A positive electrode terminal 9 is fitted into the center of the insulating seal plate 8. One end of a positive electrode lead 10 is connected to the positive electrode 4 with the other end being connected to the positive electrode terminal 9. The negative electrode 6 is connected to the container 1 as the negative electrode terminal through a negative electrode lead (not shown).

Next, the positive electrode 4, the separator 5, the negative electrode 6, and the nonaqueous electrolyte will be described in more detail.

1) Positive Electrode 4

The positive electrode 4 may be prepared by suspending a positive electrode active material, a conductive agent, and a binder in a suitable solvent, coating the suspension onto a current collector, such as an aluminum foil, drying the coated current collector, and pressing the dried, coated current collector into a strip electrode.

Various oxides and sulfides are usable as the positive electrode active material, and examples thereof include: manganese dioxide ($MnO_2$), lithium manganese composite oxides (for example, $LiMn_2O_4$ or $LiMnO_2$), lithium nickel composite oxides (for example, $LiNiO_2$), lithium cobalt composite oxides (for example, $LiCoO_2$), lithium nickel cobalt composite oxides (for example, $LiNi_{1-x}Co_xO_2$), lithium manganese cobalt composite oxides (for example, $LiMn_xCo_{1-x}O_2$) and vanadium oxides (for example, $V_2O_5$). Further, organic materials such as electrically conductive polymer materials and disulfide polymer materials may also be used. Lithium manganese composite oxide ($LiMn_2O_4$), lithium nickel composite oxide ($LiNiO_2$), lithium cobalt composite oxide ($LiCoO_2$), lithium nickel cobalt composite oxide ($LiNi_{0.8}Co_{0.2}O_2$), lithium manganese cobalt composite oxides ($LiMn_xCo_{1-x}O_2$) and the like are more preferred positive electrodes from the viewpoint of high battery voltage.

Examples of conductive agents usable herein include acetylene black, carbon black, and graphite.

Examples of binders usable herein include polytetrafluoroethylene (PTFE), polyvinylidene fluoride (PVdF), and fluororubber.

The mixing ratio of the positive electrode active material to the conductive agent to the binder is preferably 80 to 95% by weight of the positive electrode active material: 3 to 20% by weight of the conductive agent: 2 to 7% by weight of the binder.

2) Separator 5

The separator 5 may be formed of, for example, a nonwoven fabric of synthetic resin, a porous film of polyethylene, or a porous film of polypropylene.

3) Negative Electrode 6

The negative electrode 6 may be prepared by suspending a conductive agent and a binder in a suitable solvent, coating the suspension onto a metal foil, such as a copper foil, drying the coated foil, and pressing the dried, coated foil to form a strip electrode.

A part of the negative electrode active material is constituted by a material which comprises at least one member selected from the group consisting of Al, Si, Ge, Sn, P, Sb and Bi and has at least one crystal structure selected from the group consisting of $BiF_3$ structure, $Cu_2MnAl$ structure, and AgAsMg structure.

Preferably, at least one member selected from the group consisting of Al, Si, Ge, Sn, P, Sb and Bi is used from the viewpoint of long life and high capacity. In particular, the negative electrode active material preferably contains antimony as an indispensable component. In this connection, it should be noted that carbon is unfavorable because any desired crystal structure cannot be formed.

The negative electrode active material having $Cu_2MnAl$ structure is preferably at least one member selected from the group consisting of $Ni_2MnSb$, $Co_2MnSb$, $Ni_2MgSb$, and $Co_2MgSb$.

A preferred specific example of the negative electrode active material having AgAsMg structure is at least one member selected from the group consisting of FeVSb, CoTiSb, NiTiSb, NiNbSb, CoNbSb, NiVSb, CoVSb, CuMgSb, NiMnSb, CoMnSb, NiMgSb, and CoMgSb.

Further, a preferred specific example of the negative electrode active material having $BiF_3$ structure is at least one member selected from the group consisting of $Ni_3Sn$, $Co_3Sn$, $Fe_3Al$, and $Fe_3Si$.

The above negative electrode active material can occlude a large amount of an alkali metal such as lithium, and, at the same time, has high reversibility between an occlusion reaction and a release reaction and can solve the problem of crumbling involved in charge-discharge cycles. Thus, this negative electrode active material can realize a negative electrode possessing a long life and a high capacity. These advantageous characteristics are probably derived from the fact that the negative electrode active material according to the present invention is a structurally stable material which, even after the occlusion of a large amount of an alkali metal, can maintain the basic crystal structure.

In particular, from the viewpoints of both high capacity and long life, the crystal structure preferably comprise at least one member selected from the group consisting of $BiF_3$ structure, $Cu_2MnAl$ structure, and AgAsMg structure, and, more preferably, the negative electrode active material further contains an alkali metal from the viewpoint of long life.

The AgAsMg structure is a structure belonging to cF12 of Pearson Symbol. $CaF_2$ structure also belongs to cF12. Compounds having $CaF_2$ structure, such as $CoSi_2$, $NiSi_2$, $Mg_2Si$, and $Mg_2Sn$, can occlude alkali metals, such as lithium, and, as with compounds having AgAsMg structure according to the present invention, can be utilized as a high-capacity negative electrode active material. Rather, many compounds having $CaF_2$ structure have higher capacity than the compounds having AgAsMg structure according to the present invention In the case of the compounds having $CaF_2$ structure, however, at the time of occlusion and release of lithium, the crystal lattice undergoes a significant change in volume, and the repetition of charge and discharge causes disintegration of the crystal and thus results in significantly deteriorated cycle life. This makes it difficult to practically use these compounds. On the other hand, the compounds having AgAsMg structure according to the present invention have an advantageous feature such that they can moderately occlude lithium and undergo no significant change in volume and thus possesses excellent cycle life characteristics.

The $BiF_3$ structure and the $Cu_2MnAl$ structure belong to cF16 of Pearson Symbol. NaTl structure also belong to cF16. Compounds having NaTl structure include lithium alloys such as AlLi, CdLi, and GaLi. As described above, these lithium alloys are known as negative electrode active materials having very high capacity. However, as with the compounds having $CaF_2$ structure, these compounds have a problem that a change in volume of crystal at the time of charge and discharge is so large that the cycle life characteristics are deteriorated. By contrast, compounds having $BiF_3$ structure and the $Cu_2MnAl$ structure according to the present invention can occlude a suitable amount of lithium and undergo no significant change in volume and thus advantageously possess excellent cycle life characteristics.

Further, at least one element selected from the group consisting of Al, Si, Ge, Sn, P, Sb and Bi is preferably contained from the viewpoint of high capacity. The incorporation of antimony as an indispensable component is particularly preferred.

The reason why the presence of antimony as the indispensable component in the negative electrode active material is advantageous is as follows.

The negative electrode active material according to the present invention may be formed, for example, by arc melting, high frequency melting, mechanical alloying, CVD, and sputtering, and the method for forming the negative electrode active material is not particularly limited. Among others, the production of the negative electrode active material using a solid phase reaction is advantageous in that a high-performance negative electrode active material can be simply produced. This method comprises the steps of mixing powders of elements for constituting the compound together and heat treating the mixed powder to cause a solid phase reaction, thereby giving a contemplated compound.

Figure 2:
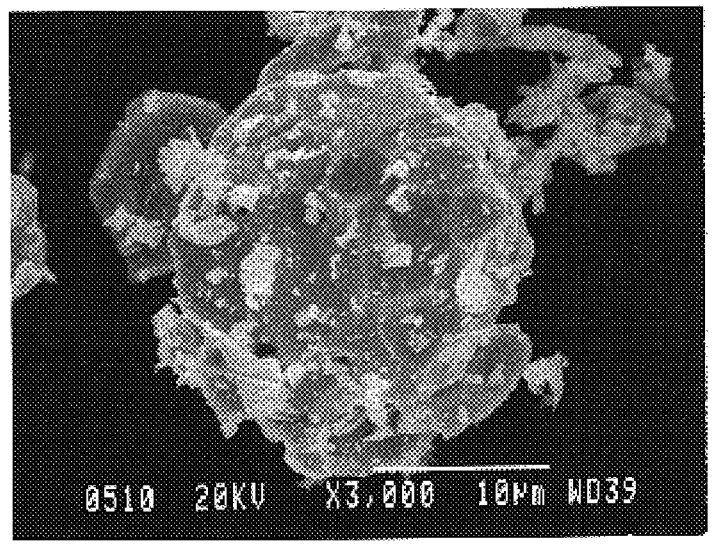
FIGS. 2 and 3 are photomicrographs of particles of a negative electrode active material ($Ni_2MnSb$) (magnification: 3000 times).

In this case, the heat treatment temperature is preferably below the melting points of the elements for constituting the compound. According to the finding of the present inventor, heat treatment at a temperature of the melting point of the constituent elements or above has a fear that, after melting and solidification steps, a second compound other than the contemplated compound is contained as an impurity phase. Further, in this case, the synthesized compound is likely to be bulky. Therefore, in use of the compound as the negative electrode active material, this compound should be pulverized. However, it has been found that powder particles produced by pulverization are particles having smooth surface which have a small specific surface area and, upon a change in volume, are less likely to relieve strain. FIG. 2 is a photomicrograph (magnification: 3000 times) of particles of a compound ($Ni_2MnSb$) which has been produced at the melting point of the constituent elements or above and has been pulverized as described above.

Figure 3:
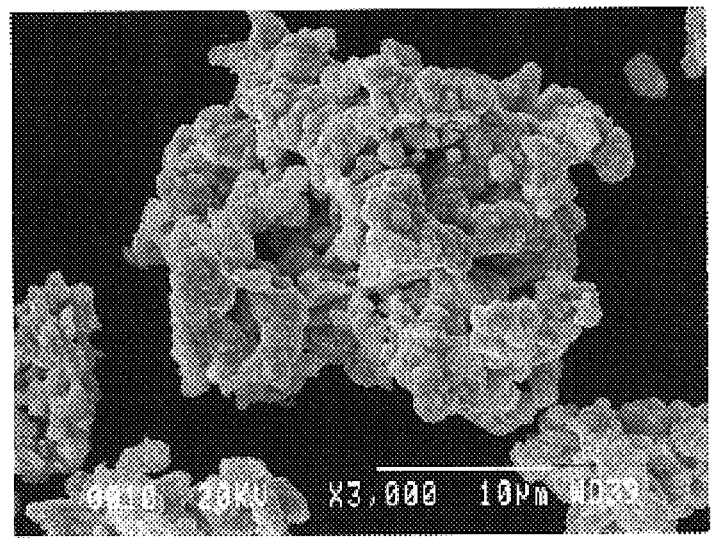

On the other hand, it has been found that, when the heat treatment is carried out at a temperature which does not melt the constituent elements, that is, at a temperature below the melting point of the element having the lowest melting point in the constituent elements, a compound is synthesized by a complete solid phase reaction, resulting in the formation of good fine particles of the compound. FIG. 3 is a photomicrograph (magnification: 3000 times) of particles of a compound ($Ni_2MnSb$) which has been produced at a temperature below the melting point of the constituent elements. As can be seen from FIG. 3, a powder is obtained which comprises primary particles of 0.05 to 2 $\mu$m connected to one another like a bunch of grapes. The compound in this form has a high specific surface area and can effectively relieve strain caused by a change in volume. This is also advantageous in that the disintegration of the particle form can be prevented.

For this reason, the negative electrode active material according to the present invention is preferably produced in a synthesis temperature region which does not melt the constituent elements. When this is taken into consideration, among the Al, Si, Ge, Sn, P, Sb and Bi the Si have an excessively high melting point which leads to synthesis at a relatively high reaction rate and thus makes it difficult to synthesize the compound in a form as shown in FIG. 3. On the contrary, tin, bismuth, phosphorus and the like have excessively low melting point which leads to synthesis at a low reaction rate and thus, here again, makes it difficult to synthesize the compound in a form as shown in FIG. 3. On the other hand, antimony has a melting point of about 630° C. which can realize an ideal reaction rate and advantageously enables the compound in a form as shown in FIG. 3 to be easily synthesized. Therefore, the incorporation of antimony as an indispensable component into the negative electrode active material according to the present invention is particularly preferred from the technical viewpoint of the above-described production method.

Both FIGS. 2 and 3 show the results of synthesis of $Ni_2MnSb$. However, FIGS. 2 and 3 are different from each other in that FIG. 2 shows a product which has been synthesized at 850° C., that is, a temperature above the melting point of antimony, while FIG. 3 shows a product which has been synthesized at 550° C., that is, a temperature below the melting point of antimony. As can be seen from FIGS. 2 and 3, the surface of particles synthesized at 850° C. is smooth and has a small specific surface area, while particles synthesized at 550° C. are constituted by aggregates (secondary particles) of small primary particles and have a large specific surface area.

According to the present invention, when the battery is a rechargeable battery with a nonaqueous electrolyte, the use of a material, into which an alkali metal (for example, lithium) has been previously incorporated, for example, $LiCoO_2$, $LiMnO_2$, or $LiNiO_2$, as a positive electrode permits the alkali metal (for example, lithium) to migrate from the positive electrode to the material according to the present invention at the time of initial charge of the battery and, thereafter, permits the material of the present invention to reversibly occlude and release the alkali metal to function as a negative electrode of the rechargeable battery. Further, in order to stabilize the charge-discharge cycles, the use of an alkali metal-containing material as a negative electrode active material is preferred even when the alkali metal-containing material is used as the positive electrode. When a material, into which an alkali metal has not been previously incorporated, for example, $CoO_2$, $MnO_2$, or $NiO_2$, is used as the positive electrode active material, a method may be adopted wherein a material, into which an alkali metal has been previously incorporated, is used as the negative electrode active material, or alternatively a laminate of an alkali metal and an alkali metal-free material according to the present invention is used to electrochemically produce an alkali metal-containing material.

When the battery is a primary battery of a battery with a nonaqueous electrolyte, it is preferred to use as a positive electrode a material into which an alkali metal has not been previously incorporated, while an alkali metal-containing material is used as the negative electrode.

The negative electrode active material preferably has an average particle diameter (an average diameter of secondary particles) in the range of 0.1 to 100 $\mu$m.

The negative electrode active material may be produced by mixing powders as a starting material together so as to provide a predetermined stoichiometric amount ratio and heat treating the mixture at a temperature of 400 to 1200° C. in an inert gas atmosphere, a reducing atmosphere or in vacuo. When the heat treatment is carried out at a temperature below 400° C., the time necessary for the compound to be produced by the reaction is long, leading to poor productivity. On the other hand, a high temperature above 1200° C. cause significant dissipation due to evaporation of an atom having high vapor pressure, such as antimony, which results in a significant change in composition from the time when the powders are mixed together.

Conductive agents usable herein include, for example, acetylene black, carbon black, and graphite.

Binders usable herein include, for example, polytetrafluoroethylene (PTFE), polyvinylidene fluoride (PVdF), fluororubber, ethylene-butadiene rubber (SBR), and carboxymethylcellulose (CMC).

The mixing ratio of the negative electrode active material to the conductive agent to the binder is preferably 70 to 95% by weight of the negative electrode active material: 0 to 25% by weight of the conductive agent: 2 to 10% by weight of the binder.

4) Nonaqueous Electrolyte

Nonaqueous electrolytes usable herein include a liquid electrolyte prepared by dissolving an electrolyte in a nonaqueous solvent, a polymeric gel-like electrolyte prepared by incorporating the nonaqueous solvent and the electrolyte into a polymeric material, a polymeric solid electrolyte containing the electrolyte alone, and a lithium ion-conductive inorganic solid electrolyte.

A nonaqueous solvent prepared by dissolving a lithium salt as an electrolyte in a nonaqueous solvent in a lithium battery may be used as the liquid electrolyte. In this case, preferred is a nonaqueous solvent composed mainly of a cyclic carbonate, such as ethylene carbonate (EC) or propylene carbonate (PC), or a nonaqueous solvent composed mainly of a mixed solvent comprised of the cyclic carbonate and a nonaqueous solvent having a lower viscosity than the cyclic carbonate (hereinafter referred to as "second solvent").

Examples of the second solvent include: linear carbonates, such as dimethyl carbonate, methylethyl carbonate, and diethyl carbonate; γ-butyrolactone; acetonitrile; methyl propionate; ethyl propionate; cyclic ethers, such as tetrahydrofuran and 2-methyltetrahydrofuran; an linear ethers, such as dimethoxyethane and diethoxyethane.

Alkali salts, particularly lithium salts, may be mentioned as the electrolyte. Lithium salts include lithium phosphate hexafluoride ($LiPF_6$), lithium borofluoride ($LiBF_4$), arsenic lithium hexafluoride ($LiAsF_6$), lithium perchlorate ($LiClO_4$), and lithium trifluoromethanesulfonate ($LiCF_3SO_3$). Among them, lithium phosphate hexafluoride ($LiPF_6$) and lithium borofluoride ($LiBF_4$) are particularly preferred. The solubility of the electrolyte in the nonaqueous solvent is preferably 0.5 to 2.0 moles/liter.

The gel-like electrolyte is one prepared by dissolving the solvent and the electrolyte in a polymeric material to form a gel. Polymeric materials usable herein include polyacrylonitrile, polyacrylate, polyvinylidene fluoride (PVdF) and polyethylene oxide (PEO), or copolymers of monomers constituting the above polymers with other monomers.

The solid electrolyte is one prepared by dissolving the electrolyte in a polymeric material to form a solid. Polymeric materials usable herein include polyacrylonitrile, polyvinylidene fluoride (PVdF) and polyethylene oxide (PEO), or copolymers of monomers constituting the above polymers with other monomers. Inorganic solid electrolytes include lithium-containing ceramic materials. Among others, $Li_3N$, $Li_3PO_4$—$Li_2S$ glass and the like may be mentioned as the inorganic solid electrolyte.

In FIG. 1, an embodiment of the present invention is shown wherein the present invention has been applied to a cylindrical battery with a nonaqueous electrolyte. Likewise, the present invention can be further applied to batteries in other forms, for example, polygonal batteries with a nonaqueous electrolyte and button batteries with a nonaqueous electrolyte. The group of electrodes housed in the container of the battery are not limited to a spiral form, and may be in the form of a stack prepared by stacking a plurality of units on top of the other or one another, each unit composed of a positive electrode, a separator, and a negative electrode stacked in that order.

EXAMPLES

Examples of the present invention will be described with reference to FIG. 1. However, it should be noted that the present invention is not limited to these examples only so far as modifications and variations fall within the scope of the present invention.

Example 1

<Preparation of Positive Electrode>

91% by weight of a lithium cobalt oxide ($LiCoC_2$) powder as a positive electrode active material, 2.5% by weight of acetylene black, 3% by weight of graphite, and 4% by weight of polyvinylidene fluoride (PVdF) were added to and mixed with an N-methylpyrrolidone (NMP) solution. The mixture was coated on a 15 μm-thick aluminum foil as a current collector. The coated aluminum foil was dried, followed by pressing to prepare a positive electrode having an electrode density of 3.0 g/cm$^3$.

<Preparation of Negative Electrode>

A nickel powder having a purity of 99% and an average particle diameter of 20 μm, a manganese powder having a purity of 99% and an average particle diameter of 20 μm, and an antimony powder having a purity of 99.9% and an average particle diameter of 20 μm were mixed together so as to provide an atomic equivalent ratio of 2:1:1. The mixture was thoroughly stirred by means of a V mixer. The thoroughly stirred mixed powder was filled into an alumina crucible, and was then heat treated under an argon gas stream at 600° C. for 120 hr, whereby these powders were allowed to react with one another. The material obtained by the heat treatment was analyzed by XRD. As a result, only a peak attributable to an $Ni_2MnSb$ phase having $Cu_2MnAl$ structure was observed, indicating that this material is constituted by a single phase of $Ni_2MnSb$. The reaction product as an aggregate was ground in an agate mortar to prepare an $Ni_2MnSb$ powder having an average particle diameter of 20 μm. 5% by weight of graphite, 3% by weight of acetylene black, 7% by weight of PVdF, and an NMP solution were added to and mixed with 85% by weight of the $Ni_2MnSb$ powder. The mixture was coated on a current collector of a 12 μm-thick copper foil. The coated copper foil was dried, followed by pressing to prepare a negative electrode.

<Preparation of Group of Electrodes>

The positive electrode, a separator formed of a porous film of polyethylene, the negative electrode, and the separator were stacked in that order on top of one another, and the stack was spirally wound so that the negative electrode was located outermost. Thus, a group of electrodes was prepared.

<Preparation of Nonaqueous Electrolysis Solution>

Lithium phosphate hexafluoride ($LiPF_6$) was dissolved in a mixed solvent composed of ethylene carbonate (EC) and methyl ethyl carbonate (MEC) (mixing volume ratio=1:2) to a concentration of 1.0 mole/liter to prepare a nonaqueous electrolyte.

The group of electrodes and the electrolysis solution were housed in a closed-end cylindrical stainless steel container to assemble a cylindrical rechargeable battery with a nonaqueous electrolyte as shown in FIG. 1.

Examples 2 to 35

Comparative Examples 1 to 12

The procedure of Example 1 was repeated, except that negative electrode active materials described in Table 1 were used instead of the negative electrode active material in Example 1. Thus, rechargeable batteries with a nonaqueous electrolyte of Examples 2 to 35 and Comparative Examples 1 to 12 were assembled.

For the batteries of Examples 1 to 35 and Comparative Examples 1 to 12, 0.5 C constant voltage (3.5 V) charge was carried out for 3 hr, and the capacity at 0.5 C discharge (discharge termination voltage=2.0 V) was then determined. The number of cycles necessary for the capacity to be reduced to 80% of the capacity of the first cycle was determined as the cycle life. The results are summarized in Table 1.

TABLE 1

| Ex., Comp. Ex. | Negative electrode active material | Discharge capacity, mAh | Cycle life, times |
|---|---|---|---|
| Ex. 1 | $Ni_2MnSb$ | 850 | 530 |
| Ex. 2 | $Co_2MnSb$ | 700 | 570 |
| Ex. 3 | $Ni_2MnSb_{0.8}Bi_{0.2}$ | 870 | 500 |
| Ex. 4 | $Co_2MnSb_{0.8}Bi_{0.2}$ | 720 | 510 |
| Ex. 5 | $Ni_2MnSb_{0.8}P_{0.2}$ | 780 | 520 |
| Ex. 6 | $Co_2MnSb_{0.8}P_{0.2}$ | 700 | 550 |
| Ex. 7 | $Ni_2MnSb_{0.8}Al_{0.2}$ | 710 | 520 |
| Ex. 8 | $Co_2MnSb_{0.8}Al_{0.2}$ | 700 | 540 |
| Ex. 9 | $Ni_2MgSb$ | 800 | 500 |
| Ex. 10 | $Co_2MgSb$ | 700 | 525 |
| Ex. 11 | $FeVSb$ | 1000 | 500 |
| Ex. 12 | $NiTiSb$ | 1000 | 520 |
| Ex. 13 | $CoTiSb$ | 1000 | 500 |
| Ex. 14 | $NiNbSb$ | 900 | 510 |
| Ex. 15 | $CoNbSb$ | 900 | 500 |
| Ex. 16 | $NiVSb$ | 1000 | 510 |
| Ex. 17 | $CoVSb$ | 1000 | 500 |
| Ex. 18 | $CuMgSb$ | 1000 | 470 |
| Ex. 19 | $NiMnSb$ | 1200 | 500 |
| Ex. 20 | $CoMnSb$ | 1200 | 490 |
| Ex. 21 | $NiMgSb$ | 1100 | 480 |
| Ex. 22 | $CoMgSb$ | 1100 | 475 |
| Ex. 23 | $NiTiSn$ | 1200 | 490 |
| Ex. 24 | $CoTiSn$ | 1200 | 480 |
| Ex. 25 | $NiTiSn_{0.8}Si_{0.2}$ | 1100 | 480 |
| Ex. 26 | $CoTiSn_{0.8}Si_{0.2}$ | 1100 | 460 |
| Ex. 27 | $NiTiSn_{0.8}Ge_{0.2}$ | 1150 | 490 |
| Ex. 28 | $CoTiSn_{0.8}Ge_{0.2}$ | 1150 | 470 |
| Ex. 29 | $LiNi_2MnSb$ | 1100 | 550 |
| Ex. 30 | $Li_{0.1}Co_2MnSb$ | 900 | 600 |
| Ex. 31 | $Ni_3Sn$ | 800 | 500 |
| Ex. 32 | $Co_3Sn$ | 700 | 550 |
| Ex. 33 | $Mn_3Si$ | 700 | 500 |
| Ex. 34 | $Fe_3Si$ | 800 | 450 |
| Ex. 35 | $Fe_3Al$ | 700 | 450 |
| Comp. Ex. 1 | Al | 1000 | 150 |
| Comp. Ex. 2 | Sn | 1300 | 100 |
| Comp. Ex. 3 | SnO | 780 | 50 |
| Comp. Ex. 4 | $SnO_2$ | 700 | 80 |
| Comp. Ex. 5 | Sb | 1200 | 120 |
| Comp. Ex. 6 | Bi | 1200 | 150 |
| Comp. Ex. 7 | Li | 1400 | 80 |
| Comp. Ex. 8 | Li—Al | 1200 | 120 |
| Comp. Ex. 9 | $NiSi_2$ | 1300 | 50 |
| Comp. Ex. 10 | $CoSi_2$ | 1200 | 75 |
| Comp. Ex. 11 | $Mg_2Si$ | 1600 | 30 |
| Comp. Ex. 12 | $Mg_2Sn$ | 1500 | 35 |

As is apparent from the results, the negative electrode active materials according to the present invention can provide rechargeable batteries with a nonaqueous electrolyte which have a high capacity and, at the same time, have excellent charge-discharge cycle characteristics.

As described above, the present invention can provide batteries with a nonaqueous electrolyte which are improved in both discharge capacity and service life, that is, have high discharge capacity and, at the same time, have prolonged service life.

What is claimed is:

1. A battery with a nonaqueous electrolyte, comprising:
   a positive electrode;
   a negative electrode having a negative electrode active material capable of occluding and releasing an alkali metal, said negative electrode active material containing at least one element selected from the group consisting of Al, Si, Ge, Sn, P, Sb and Bi and having at least one crystal structure selected from the group consisting of a $BiF_3$ structure and a $Cu_2MnAl$ structure; and
   a nonaqueous electrolyte.

2. The battery with a nonaqueous electrolyte according to claim 1, wherein the negative electrode active material further contains an alkali metal.

3. The battery with a nonaqueous electrolyte according to claim 1, wherein the positive electrode contains an alkali metal.

4. The battery with a nonaqueous electrolyte according to claim 1, wherein the negative electrode active material having $Cu_2MnAl$ structure and is at least one member selected from the group consisting of $Ni_2MnSb$, $Co_2MnSb$, $Ni_2MgSb$, and $Co_2MgSb$.

5. The battery with a nonaqueous electrolyte according to claim 1, wherein the negative electrode active material is a compound which has been synthesized at a temperature below the melting point of antimony.

6. The battery with a nonaqueous electrolyte according to claim 1, wherein the negative electrode active material is in the form of agglomerates of primary particles, wherein the primary particles have a size of 0.05 to 2 $\mu$m.

7. The battery with a nonaqueous electrolyte according to claim 6, wherein the agglomerates have an average diameter of 0.1 to 100 $\mu$m.

8. The battery with a nonaqueous electrolyte according to claim 1, wherein the negative electrode active material has a $BiF_3$ structure and is at least one member selected from the group consisting of $Ni_3Sn$, $Co_3Sn$, $Fe_3Al$, and $Fe_3Si$.

9. The battery with a nonaqueous electrolyte according to claim 1, wherein the negative electrode comprises a conductive agent selected from the group consisting of acetylene black, carbon black, graphite, and mixtures thereof.

10. The battery with a nonaqueous electrolyte according to claim 9, wherein the negative electrode comprises a binder comprising one member selected from the group consisting of polytetrafluoroethylene (PTFE), polyvinylidene fluoride (PVdF), fluororubber, ethylenebutadiene rubber (SBR), carboxymethylcellulose (CMC), and mixtures of these materials.

11. The battery with a nonaqueous electrolyte according to claim 1, wherein the negative electrode comprises
a negative electrode active material in an amount of from 70 to 95% based on the total weight of the negative electrode,
a conductive agent in an amount of from 0 to 25% based on the total weight of the negative electrode,
a binder in an amount of from 2 to 10% based on the total weight of the negative electrode,
wherein the conductive agent comprises at least one selected from the group consisting of acetylene black, carbon black, graphite, and mixtures thereof, and
wherein the binder comprises at least one selected from the group consisting of polytetrafluoroethylene (PTFE), polyvinylidene fluoride (PVdF), fluororubber, ethylenebutadiene rubber (SBR), carboxymethylcellulose (CMC), and mixtures thereof.

12. A battery with a nonaqueous electrolyte, comprising:
a positive electrode;
a negative electrode having a negative electrode active material capable of occluding and releasing an alkali metal, said negative electrode active material comprising antimony and having at least one crystal structure selected from the group consisting of a $BiF_3$ structure and a $Cu_2MnAl$ structure; and
a nonaqueous electrolyte.

13. The battery with a nonaqueous electrolyte according to claim 12, wherein the negative electrode active material further contains an alkali metal.

14. The battery with a nonaqueous electrolyte according to claim 12, wherein the positive electrode contains an alkali metal.

15. The battery with a nonaqueous electrolyte according to claim 12, wherein the negative electrode active material has a $Cu_2MnAl$ structure and is at least one member selected from the group consisting of $Ni_2MnSb$, $Co_2MnSb$, $Ni_2MgSb$, and $Co_2MgSb$.

16. The battery with a nonaqueous electrolyte according to claim 12, wherein the negative electrode active material is a compound which has been synthesized at a temperature below the melting point of antimony.

17. The battery with a nonaqueous electrolyte according to claim 12, wherein the negative electrode active material is in the form of agglomerates of primary particles, wherein the primary particles have a size of 0.05 to 2 μm.

18. The battery with a nonaqueous electrolyte according to claim 17, wherein the negative electrode active material has an average particle diameter of 0.1 to 100 μm in terms of the agglomerates.

19. The battery with a nonaqueous electrolyte according to claim 12, wherein the negative electrode comprises a conductive agent selected from the group consisting of acetylene black, carbon black, graphite, and mixtures thereof.

20. The battery with a nonaqueous electrolyte according to claim 19, wherein the negative electrode comprises a binder comprising one member selected from the group consisting of polytetrafluoroethylene (PTFE), polyvinylidene fluoride (PVdF), fluororubber, ethylenebutadiene rubber (SBR), carboxymethylcellulose (CMC), and mixtures of these materials.

21. The battery with a nonaqueous electrolyte according to claim 12, wherein the negative electrode comprises
a negative electrode active material in an amount of from 70 to 95% based on the total weight of the negative electrode,
a conductive agent in an amount of from 0 to 25% based on the total weight of the negative electrode,
a binder in an amount of from 2 to 10% based on the total weight of the negative electrode,
wherein the conductive agent comprises at least one selected from the group consisting of acetylene black, carbon black, graphite, and mixtures thereof, and
wherein the binder comprises at least one selected from the group consisting of polytetrafluoroethylene (PTFE), polyvinylidene fluoride (PVdF), fluororubber, ethylenebutadiene rubber (SBR), carboxymethylcellulose (CMC), and mixtures thereof.

22. A battery with a nonaqueous electrolyte, comprising:
a positive electrode;
a negative electrode having a negative electrode active material capable of occluding and releasing an alkali material, said negative electrode active material containing at least one element selected from the group consisting of group 4B elements and group 5B elements and having at least one crystal structure selected from the group consisting of a $BiF_3$ structure and a $Cu_2MnAl$ structure; and
a nonaqueous electrolyte.

23. The battery with a nonaqueous electrolyte according to claim 22, wherein the negative electrode active material further contains an alkali metal.

24. A battery with a nonaqueous electrolyte, comprising:
a positive electrode;
a negative electrode having a negative electrode active material capable of occluding and releasing an alkali metal, said negative electrode active material containing at least one element selected from the group consisting of Al, Si, Ge, Sn, P, Sb and Bi and having at least one $Cu_2MnAl$ crystal structure selected from the group consisting of $Ni_2MnSb$, $Co_2MnSb$, $Ni_2MgSb$, and $Co_2MgSb$; and
a nonaqueous electrolyte.

25. A battery with a nonaqueous electrolyte, comprising:
a positive electrode;
a negative electrode having a negative electrode active material capable of occluding and releasing an alkali metal, said negative electrode active material containing at least one element selected from the group consisting of Al, Si, Ge, Sn, P, Sb and Bi and having at least one $BiF_3$ crystal structure selected from the group consisting of $Ni_3Sn$, $Co_3Sn$, $Fe_3Al$, and $Fe_3Si$; and
a nonaqueous electrolyte.

26. A battery with a nonaqueous electrolyte, comprising:
a positive electrode;
a negative electrode having a negative electrode active material capable of occluding and releasing an alkali metal, said negative electrode active material comprising antimony and having at least one $Cu_2MnAl$ crystal structure selected from the group consisting of $Ni_2MnSb$, $Co_2MnSb$, $Ni_2MgSb$, and $Co_2MgSb$; and
a nonaqueous electrolyte.

27. A battery with a nonaqueous electrolyte, comprising:
a positive electrode;
a negative electrode having a negative electrode active material capable of occluding and releasing an alkali metal, said negative electrode active material containing at least one element selected from the group consisting of group 4B elements and group 5B elements and having at least one $Cu_2MnAl$ crystal structure selected from the group consisting of $Ni_2MnSb$, $Co_2MnSb$, $Ni_2MgSb$, and $Co_2MgSb$; and a nonaqueous electrolyte.

28. A battery with a nonaqueous electrolyte, comprising:

a positive electrode;

a negative electrode having a negative electrode active material capable of occluding and releasing an alkali metal, said negative electrode active material containing at least one element selected from the group consisting of group 4B elements and group 5B elements and having at least one $BiF_3$ crystal structure selected from the group consisting of $Ni_3Sn$, $Co_3Sn$, $Fe_3Al$, and $Fe_3Si$; and a nonaqueous electrolyte.

29. A battery with a nonaqueous electrolyte, comprising:

a positive electrode;

a negative electrode having a negative electrode active material capable of occluding and releasing an alkali metal, said negative electrode active material containing at least one element selected from the group consisting of Al, Si, Ge, Sn, P, Sb and Bi and having at least one crystal structure selected from the group consisting of a $BiF_3$ structure, a $Cu_2MnAl$ structure and a AgAsMg structure; and a nonaqueous electrolyte, wherein the negative electrode active material is in the form of agglomerates of primary particles, wherein the primary particles have a size of 0.05 to 2 µm.

30. The battery according to claim 29, wherein the negative electrode is the negative electrode upon discharge.

31. A battery with a nonaqueous electrolyte, comprising:

a positive electrode;

a negative electrode having a negative electrode active material capable of occluding and releasing an alkali metal, said negative electrode active material comprising antimony and having at least one crystal structure selected from the group consisting of a $BiF_3$ structure, a $Cu_2MnAl$ structure and a AgAsMg structure; and a nonaqueous electrolyte, wherein the negative electrode active material is in the form of agglomerates of primary particles, wherein the primary particles have a size of 0.05 to 2 µm.

32. The battery according to claim 31, wherein the negative electrode is the negative electrode upon discharge.

33. A battery with a nonaqueous electrolyte, comprising:

a positive electrode;

a negative electrode having a negative electrode active material capable of occluding and releasing an alkali metal, said negative electrode active material containing at least one element selected from the group consisting of group 4B elements and group 5B elements and having at least one crystal structure selected from the group consisting of a $BiF_3$ structure, a $Cu_2MnAl$ structure and a AgAsMg structure; and a nonaqueous electrolyte, wherein the negative electrode active material is in the form of agglomerates of primary particles, wherein the primary particles have a size of 0.05 to 2 µm.

34. The battery according to claim 33, wherein the negative electrode is the negative electrode upon discharge.

* * * * *